3,336,257
HIGH MOLECULAR WEIGHT THERMOPLASTIC RESIN FROM THE POLYMERIZATION OF DIPHENOLS AND DIEPOXIDES
Francis Bertrand Alvey, Louisville, Ky., assignor to Celanese Coatings Company, a corporation of Delaware
No Drawing. Filed June 29, 1965, Ser. No. 468,120
10 Claims. (Cl. 260—47)

This is a continuation-in-part of my application, Serial No. 373,523, filed June 8, 1964, and now abandoned.

This invention relates to a process for preparing high molecular weight thermoplastic resins. More particularly this invention pertains to a method wherein a low molecular weight thermoplastic resinous composition containing substantially equivalent amounts of terminal 1,2-epoxy groups and phenolic hydroxyl groups is heat aged to complete the polymerization to produce a high molecular weight thermoplastic resin.

The process of the present invention produces a high molecular weight thermoplastic resin having a melting point of at least about 200° C. and having substantially no branched or cross-linked groups. These high molecular weight, high strength, thermoplastic resins have excellent resilient properties and are particularly useful in the formation of various shaped objects, such as by the injection molding, blow molding, vacuum molding, casting, etc. When dissolved in a solvent, lacquers are obtained which can be used for coatings, adhesives, impregnations, and the like.

The thermoplastic resins of this invention are polyhydroxy-polyether resins, and because of the presence of the hydroxyl groups in the molecule, the resins can be reacted with monofunctional compounds which react with the hydroxyl groups of the resin to produce modified thermoplastic resins. Examples of such monofunctional compounds are the monoisocyanates, monobasic acids, including the drying oil acids, monoepoxides, acetyl chloride, benzoyl chloride, acrylonitrile, etc. Also, the thermoplastic resins of the invention can be reacted through the hydroxyl groups with polyfunctional compounds to produce various cross-linked polymers. Examples of such polyfunctional compounds are the polyisocyanates, polyepoxides, aminoplast resins, alkylated aminoplast resins, phenolplast resins, polybasic acids and anhydrides, etc. If desired, small enough amounts of these polyfunctional compounds can be used so that the high molecular weight thermoplastic resins are chemically modified without forming thermoset resins.

It has now been surprisingly found that high melting, high molecular weight thermoplastic resins may be produced by heat aging certain polyhydroxypolyether resins as hereinafter described. The present invention also provides particular advantages in the fabrication of industrial products.

The polyhydroxypolyether resins before heat aging due to their melting points and low molecular weights can be readily shaped and fabricated into desirable forms and can be readily modified by the addition of various nonreactive ingredients.

The low molecular weight polyether resins can be pulverized or micronized into small particles. Upon subsequent heat aging in a fluidized bed, on a moving belt, or suspended in an inert liquid, the high molecular weight, high melting resin is produced in a finely divided form that is readily adaptable for future processing.

Filler materials can be incorporated in the low molecular weight, low melting resin in high concentrations. Intimate contact of the fillers and resins is obtainable since the low melting resin because of its low viscosity and low surface tension at mixing temperature quite readily wets the fillers. High amounts of fillers can also be used in admixture with the low molecular weight, low melting resin producing mixtures that can be handled quite readily. Upon subsequent heat aging of these low molecular weight resin-filler mixtures, high melting resin-filler mixtures are obtained.

High melting thermoplastic polyhydroxypolyether resins can be obtained which are free of solvent contamination and undesirable inert salts.

In addition to the above advantages, the low molecular weight resin can be shaped into the form desired for the final product. This form can be retained during the heat-aging process thereby producing the high molecular weight finished product. For example, fibers can be drawn from the low molecular weight product and, after heat aging, high molecular weight strong fibers result. These low molecular weight resins can be melted, poured into a mold and heat aged in this form. The low molecular weight product can also be melted and sprayed upon a surface and heat aged in this form producing a strong resistant film having excellent adhesion to the surface.

The process of this invention can be quite readily adapted to a continuous process. For instance, the low molecular weight resin can be extruded onto a moving belt. The moving belt can then be moved through a heated oven wherein the heat aging takes place. When the desired melting point of the final resin is obtained, the belt can be led from the oven and the high molecular weight thermoplastic resin can be removed by flaking or any other known means.

These and other advantages will be apparent to those skilled in the art and can be used without departing from the spirit of the invention.

In carrying out the process of this invention, a low molecular weight thermoplastic resinous polyhydroxypolyether composition having a Durran's melting point of about 50° C. to about 180° C. and preferably about 90° C. to about 140° C., and containing substantially equivalent amounts of terminal 1,2-epoxy groups and phenolic hydroxyl groups, is heated in the presence of a basic organic catalyst to effect substantially complete reaction of the epoxy groups with the phenolic groups to form a high molecular weight thermoplastic resin having a melting point in excess of 200° C. The low molecular weight resinous composition is, on the average, substantially linear in structure and contains no more than two functional groups per molecule, i.e. an epoxy group and a phenolic hydroxyl group. The thermoplastic resinous composition may be conveniently heat aged in the form of a solid mass, such as in the molded state, or in particulate state, e.g. in the fluid form, such as a fluidized bed or as a solid suspension in an inert liquid. For example, the normally solid resinous composition may be heated by passing through a preheated oven on a conveyor, or alternatively, and preferably, a fluidized bed of the resinous composition may be heated with preheated air or inert gas at the desired temperature.

The basic organic catalyst to be employed are, for example, the so-called Bronsted type bases which are proton acceptors. Such catalysts are primary, secondary and tertiary amines, quaternary ammonium compounds, N-alkyl acid amides, N,N-dialkyl acid amides, dialkyl and tetrasubstituted ureas and thioureas, alkyl-substituted guanadines, and the like. The amount of catalyst employed in the present invention are those conventionally referred to as catalytic amounts. Generally, at least about 0.01 weight percent based on the resinous composition is required. Optimum amounts of a given catalyst are determinable by routine experimentation, but from 0.01 to 0.5 weight percent of catalyst will suffice for most purposes. In some instances, it is desirable to use higher amounts of fatty amines or certain dialkyl acid amides such as dialkyl fatty acid amides, the greater than catalytic quantity serving as plasticizer for the high molecular weight products.

The catalyst may be added directly to the resinous composition in the predetermined amount, or alternatively, the catalyst may already be present in the resinous compositions as described hereinafter.

The heat aging of the resinous composition is continued until the high melting products melting point is at least 200° C. or higher as desired. It is especially desirable to continue heat aging until the product melting point is above 250° C. since such products have exceptional physical properties. For example, heat aged products produced in accordance with this invention and melting above 250° C., e.g. from 260° C. to 270° C., have excellent impact strength as described hereinafter. Samples of the product may be taken during the heat aging to determine the heating schedules for any desired melting point. Usually, the heat aging step is conducted in the temperature range from about 90° C. to about 175° C., with the preferred range being 110° C. to 150° C. Of course, temperatures lower than 90° C. may be employed but these usually require inordinately prolonged aging periods. The time required for heat aging will vary with aging temperature and the desired melting point of the end product. Normally, time periods of from 6 hours to 24 hours or even slightly longer periods are satisfactory. Excessively high temperatures i.e. well above 175° C., should be avoided since side reactions may occur as a result of which the desired properties will not be attained, e.g., the product may be brittle or of low impact strength. It is convenient and preferable to heat the resinous composition in the solid state or at least in a semisolid state and as the melting temperature of the composition increases, the aging temperature may be increased as desired.

As has been hereinbefore described, the resinous composition is preferably heat aged in the solid form. For example, an amorphous solid mass of the resinous composition may be heated in an oven of fixed or variable temperature or alternatively on a continuous basis by passage on a moving belt through an oven adapted therefor. The mass, before heat aging, may be in any desired geometric form. It can be cast into cylinders, rods, blocks or sheets to permit shredding, granulating or extruding in future processing. It can be pulverized into fine powders, down to particle sizes of 0.001 to about 0.05 inch diameter, so that heated inert gases can be passed through the powders to effect the heat aging or the powders can be heat aged while suspended in an inert non-solvent type liquid.

The low molecular weight polyhydroxypolyether resin which is heat aged to produce the high melting thermoplastic resin is made by heating a diepoxide and a diphenol in substantially equivalent molar ratios in the presence of a catalyst. No solvents are necessary. The reactants are stirred at the desired temperature until the desired viscosity is obtained. The resulting low melting resin is then ready to be heat aged as hereinbefore described. The diepoxide, diphenol and catalyst can also be heated while dissolved in a solvent. When the desired extent of reaction has been obtained, the solvent is removed and the heat aging step is conducted. The diepoxide and diphenol can also be reacted while suspended in an inert liquid. The preferred method is to carry out the reaction between the diphenol and the diepoxide with no solvent or inert liquid present.

The diepoxide, diphenol and catalyst can be reacted to the desired intermediate product and can be subsequently heat aged to form the high melting thermoplastic resin with no interruption in the heating process. This composite or continuous process has economic advantages in large scale industrial operations.

In preparing the low molecular weight polyhydroxypolyether resin, which contains an average of one epoxy group and one phenolic hydroxyl group per molecule, a diphenol and a diepoxide are heated in substantially equivalent ratios, i.e. one epoxy group of the diepoxide per 0.95 to 1.05 phenolic hydroxyl group of the diphenol phenolic hydroxyl group. The reaction is conducted at a temperature below the peak exotherm. As is well known to those skilled in the art, the reaction of an epoxide compound and a phenolic compound is exothermic with much heat being generated. For example, when the diglycidyl ether of p,p'-dihydroxydiphenyl propane (Bisphenol A diglycidyl ether) is heated with a substantially equivalent amount of Bisphenol A and a basic catalyst to a temperature of about 100° C., the temperature, if no cooling or control is attempted, will quickly rise to 150° C. to 200° C. or higher. The ultimate temperature reached is known as the peak exothermic temperature. This peak exotherm will vary depending upon the type epoxide compounds and phenolic compounds, the type and concentration of the catalyst, the amounts of reactants and the physical shape of the reactants and reactor. The peak exotherm for any particular set of reactants under any particular conditions can be readily determined. The diepoxide, diphenol and catalyst are blended together and are heated slowly. When the exothermic reaction begins, as noted by an increase in the rate of temperature rise, the heating source is removed, and the maximum temperature attained by the reactants is observed. The peak exotherm can also be determined by placing the reactants in a constant temperature bath, generally at a temperature of 100° C. to 125° C., and observing the maximum temperature reached.

It has now been found that in contrast with the present invention heat aging a polyhydroxypolyether resin which has been made from a diphenol and diepoxide reacted to the peak exotherm does not produce high molecular weight, high melting resins having outstanding strength and impact properties. Side reactions occur during the peak exothermic reaction which can lead to branching and cross-linking of the polymer structure, and to degraded and low molecular weight fractions. However, when the initial reaction of the diphenol and diepoxide is controlled below the peak exotherm, subsequent heat aging of the reaction product produces high molecular weight, high melting thermoplastic resins having excellent strength and impact properties. Generally, the initial reaction of the diepoxide and diphenol is carried out at a temperature of about 75° C. to about 140° C. and preferably at a temperature of about 110° C. to about 130° C.

In conducting one embodiment of the process of this invention, a diepoxide, a diphenol and a basic organic catalyst are heated to a temperature below the peak exotherm until the resulting polyhydroxypolyether resin has a Durran's melting point of about 50° C. to about 180° C., and preferably about 90° C. to about 140° C. The Durran's melting point determination is described by Gardner and Sward in "Paint Testing Manual," 12th edition (1962), p. 367. The method is as follows:

"Three grams of resin is melted in a test tube (15 cm. by 17 mm.) in a bath of sulphuric acid. A thermometer with a bulb long enough to extend above the melt is inserted in the melt. The tube is then withdrawn from the bath and when the resin has hardened, exactly 50 grams of mercury is poured onto it. The tube is then replaced in the bath which is then heated so that temperature rises at the rate of 2° C. per minute. The softening point is the temperature at which the resin first appears above the mercury."

The resulting product can then be heat aged with no excessive exothermic reaction taking place to produce a high molecular weight thermoplastic resin having a melting point above 200° C.

When a substantially equivalent ratio of a diphenol and a diepoxide are reacted to form a polyhydroxypolyether resin having a Durran's melting point of about 50° C. to about 180° C., about 50 percent to about 95 percent of the epoxide groups and phenolic hydroxyl groups originally present have reacted. The relation between the melting point and the extent of reaction, which can be readily determined by analyzing for epoxide and phenolic hydroxyl content, will depend to some extent upon the type of diepoxide and diphenol being used. Low melting diepoxides and/or diphenols will produce polyhydroxy-polyether compositions having melting points in the low range with percent reactions in the high range. Higher melting diepoxides and/or diphenols will produce compositions having higher melting points and lower percent reaction. Generally, the reaction will be carried to 60 percent to 80 percent completion and to melting points of 90° C. to 140° C.

In another embodiment of this invention, substantially equivalent ratios of a diepoxide and a diphenol plus a basic organic catalyst are heated below the peak exotherm until the exothermic reaction is substantially over and heating is continued to effect substantially complete reaction of the diepoxide and the diphenol until a thermoplastic resin having a melting point in excess of 200° C. is produced.

The diphenols which are employed according to this invention are defined herein as compounds having two phenolic hydroxyl groups and no other groups reactive with epoxy groups under the conditions of the reaction. These compounds may be mononuclear or polynuclear compounds so long as the total number of phenolic hydroxyl groups per molecule is two. Mixtures of diphenols can be used. The preferred diphenol is p,p'-dihydroxydiphenyl propane which is commonly known as Bisphenol A. Bisphenol A is obtained commercially in 95 percent or better purity, but can be obtained in practically 100 percent purity. Other suitable diphenols are dihydroxydiphenyl methane, dihydroxydiphenyl ethane, dihydroxydiphenyl sulfone, dihydroxydiphenyl hydroquinone, resorcinol, dihydroxy naphthalene, dihydroxydiphenyl oxide, etc.

The diepoxides which are reacted with the diphenols of this invention are defined herein as those diepoxides which have only two epoxide groups in the molecule, both of these epoxide groups being terminal epoxide groups.

The preferred diepoxides are the diglycidyl ethers of diphenols, particularly the diglycidyl ether prepared from Bisphenol A in a large excess of epichlorohydrin using caustic as the dehydrohalogenating agent. When 1 mol of Bisphenol A is reacted in 10 mols of epichlorohydrin with 2 mols of caustic, the resulting product has an epoxide equivalent weight of 185 to 200. This product can be purified by known methods, such as molecular distillation and crystallization. The purified products have epoxide equivalent weights ranging from about 180 to 170 depending upon the degree of purity, the 170 epoxide equivalent weight being 100 percent pure.

Other diglycidyl ethers of Bisphenol A, advantageously those having a melting point below about 100° C., can also be used. Such diglycidyl ethers are prepared by reacting Bisphenol A and epichlorohydrin with aqueous alkali. The ratio of epichlorohydrin to Bisphenol A can preferably be varied from about 1.4 to 2.6 mols of epichlorohydrin to 1 mol of Bisphenol A, using sodium hydroxide in an amount which is equivalent to the chlorine of the epichlorohydrin plus 10 to 20 percent excess. These glycidyl ethers will have epoxide equivalent weights that range from about 750 for the highest melting resin down to about 225.

Diglycidyl ethers of other diphenols, such as those described above which are reacted with the diepoxides of this invention, can also be used.

Diglycidyl ethers of glycols, which are prepared by the reaction of epichlorohydrin and an aliphatic diol, can also be used. Aliphatic diols, for instance, are ethylene glycol, 1,2 propylene glycol, 1,4 butanediol, 1,5 pentanediol, 1,4 hexanediol, and the diethylene oxide and dipropylene oxide adducts of diphenols, etc.

Additional diepoxides are those resulting from the hypohalogenation and dehydrohalogenation of compounds containing two terminal unsaturated groups and also the peroxidation products from such unsaturated compounds. Diepoxides of this type are made from butadiene, divinyl cyclohexane, and the like. Other diepoxides include diglycidyl esters of dibasic acids, such as diglycidyl adipate, diglycidyl azelate, the diglycidyl esters of dimerized fatty acids, etc., the N,N diglycidyl amines which include N,N diglycidyl aniline, N,N diglycidyl butylamine, N,N diglycidyl benzamine, etc.

Therefore, any suitable diepoxide, or mixture of diepoxides, can be used so long as it contains two terminal epoxide groups and is capable of being mixed and copolymerized with the diphenols in the presence of a basic organic catalyst according to the process of the present invention.

The low molecular weight low melting polyhydroxy-polyethers of this invention can be quite readily blended with a wide variety of fillers. High percentages of fillers, up to 50 weight percent or higher, can be incorporated in the compositions and intimate uniform mixtures can be obtained. Upon subsequent heat aging of the low molecular weight polyhydroxypolyether-filler mixture high molecular weight compositions are obtained which have a wide variety of desirable physical properties. The fillers can be added to the initial blend of diepoxide and diphenol or they can be added to the intermediate composition at any stage prior to heat aging. Fillers which can be used are any inert compositions, i.e. compositions which contain no groups which are reactive with epoxide groups or phenol groups. Such fillers include finely divided metals, aluminium, copper, iron, brass, etc., finely divided metal oxides, alumina, copper oxide, magnesium oxide, etc., metal salts, clays, silicates, glass in various forms such as beads, fibers, etc., organic and inorganic pigments, high molecular weight polyglycols, polycarbonates, polyvinyl chloride, polymethyl methacrylate, chlorinated polymerized hydrocarbons, polyamides, silicone rubbers, polyfluoro hydrocarbons, carbon black, sugar, sodium chloride, wood fibers, etc.

Catalysts which are used in the process of this invention are basic organic catalysts as hereinbefore described. These catalysts include tertiary amines, such as trimethylamine, tributylamine, trioctylamine, trioleylamine, N,N diethylbutylamine, N methyl diisopropylamine, etc. Additional catalysts are N-alkylacid amides and related compounds. Specifically, these catalysts can be represented by the general formula which is a member of the group consisting of (A)
$$R_1-\overset{O}{\underset{}{C}}-N\overset{R_2}{\underset{R_3}{}}$$

wherein $R_1$ is a member of the group consisting of hydrogen, alkyl, phenyl, alkyl substituted phenyl, hydrogen-N-alkyl, alkyl-N-alkyl, alkyl-N-phenyl $R_2$ is a member of the group consisting of hydrogen, alkyl, phenyl and alkyl substituted phenyl; $R_3$ is alkyl, and (B)
$$(H_2C)_n-C=O \atop \underset{R_4}{N}$$

wherein $R_4$ is hydrogen, alkyl or vinyl and wherein $n$ is an integer from 3 to 5.

Specific examples of this type of catalyst are:
N,N-dimethyl formamide
N,N-dimethyl acetamide
N,N-diethyl acetamide
N,N-dimethyl propionamide
N,N-diethyl-n-butyramide
N,N-dimethyl-n-butyramide
N,N-diethyl dodecanamide
N,N-dimethyl benzamide
1,3-dimethyl thiourea
N-methyl-2-pyrrolidone N-vinyl-2-pyrrolidone
N-methyl acetamide
N,N-dimethyl carbanilide
Tetramethyl urea
Pyrrolidone
Caprolactam For a further understanding of the invention, reference is made to the following specific examples. These examples are intended to be illustrative of the invention only, since different embodiments can be made without departing from the invention. Parts are by weight.

The melting point or melting range of the thermoplastic polymers was determined by placing a small amount (0.1 gram or less) on a Fisher Hot Stage Melting Apparatus and observing the temperature at which the polymer became free flowing.

*Example 1*

To a suitable reaction flask equipped with a thermometer, mechanical stirrer and condenser were added 744 parts of the diglycidyl ether of Bisphenol A, having an epoxide equivalent weight of 186, and 456 parts of Bisphenol A, freezing point 153° C. The molar ratio of epoxide groups to phenolic hydroxyl of these reactants was 1 to 1. Heat was applied to the flask raising the temperature to 65° C. in 30 minutes where strirring was begun. After an additional 30 minutes heating, the temperature was raised to 115° C. and a clear solution of Bisphenol A and epoxide compound was obtained. Dimethyl formamide, 2.8 parts, was added to the reactants. Within 7 minutes, the temperature had risen to 137° C. External cooling was applied to the flask lowering the temperature to 125° C. The temperature was controlled between 125° C. and 135° C. for one hour after which time the flask contents had become too viscous to stir. The flask contents were poured into metal containers which were placed in an oven at 125° C. After two hours in the oven at 125° C., the resinous product had a melting point as determined on a Fisher heating block of 200° C. to 210° C. and an epoxide equivalent weight of 80,000. The resin was left in the oven overnight and after a total of 22.5 hours heating, 3 hours at 125° C., and 19.5 hours at 150° C., the product had a melting point of 245° C. to 255° C., no epoxide content, a Gardner-Holdt viscosity of V to W and a Gardner color of 1 to 2 at 20 percent nonvolatiles in the monobutyl ether of diethylene glycol.

The resinous product, 12.5 parts, was dissolved in 14.2 parts of methyl ethyl ketone, 17.6 parts of ethylene glycol monoethyl ether acetate, and 5.6 parts of toluene. Films were prepared on electrolytic tin plate using a 2 mil doctor blade. After heating for 30 minutes at 150° C., the films had excellent adhesion and passed an 80 inch-pound impact test. Films prepared on glass in the same manner after heating for 30 minutes at 150° C. had good adhesion, flexibility and mar resistance. The pencil hardness was 6H to 7H.

*Example 2*

To a suitable reaction flask equipped as described in Example 1 were added 744 parts of the diglycidyl ether of Bisphenol A, epoxide equivalent weight 186, and 456 parts of Bisphenol A, freezing point 153° C. The ratio of epoxide and phenolic hydroxyl equivalents was 1 to 1. Heat was applied and at 50° C., stirring was begun. At 88° C., a clear solution was obtained and 2.8 parts of dimethyl formamide were added to the flask. The temperature of the reactants was raised to 125° C. and was held at 120° C. to 127° C. for 70 minutes.

The reactants at this point had a Durran's melting point of 100° C. to 105° C. and an epoxide equivalent weight of 1824, indicating a conversion of 83.5 percent. The reactants were poured into metal containers and were placed in an oven at 125° C. After two hours in the oven, the resinous reactants had a melting point of 190° C. to 200° C. and an epoxide equivalent weight of 18,000. The temperature of the oven was raised to 150° C. and the product was heated at this temperature for 19 hours. The resulting product had a melting point of 230° C. to 250° C. and no epoxide content. The Gardner-Holdt viscosity was V to W and the Gardner color was 1 to 2 at 20 percent nonvolatiles in the monobutyl ether of diethylene glycol.

*Example 3*

To a suitable reaction flask equipped as described in Example 1 were added 171.5 parts of the diglycidyl ether of Bisphenol A, epoxide equivalent weight of 171.5, and 114.1 parts of Bisphenol A, freezing point 153° C. The ratio of epoxide and phenolic hydroxyl equivalents was 1 to 1. Heat was applied and at 55° C. stirring was begun. When a clear solution was obtained, the temperature being 75° C., 0.7 part of dimethyl formamide was added. The temperature was raised to 125° C. and was held at 122° C. to 128° C. for 1 hour with stirring. The flask contents were poured into metal containers and were heated in an oven at 125° C. for 2 hours and at 150° C. for 19 hours. The resinous product had a melting point of 285° C. to 290° C., a viscosity of Z–1 to Z–2 and a color of 3 at 20 percent nonvolatiles in the monobutyl ether of diethylene glycol, and no epoxide content.

*Example 4*

To a suitable reaction flask equipped as described in Example 1 were added 744 parts of the diglycidyl ether of Bisphenol A, epoxide equivalent weight 186, and 456 parts of Bisphenol A, freezing point 153° C. The ratio of epoxide and phenolic hydroxyl equivalents was 1 to 1. Heat and stirring were applied raising the temperature to 118° C. to dissolve the Bisphenol A. The temperature was lowered to 104° C. and 3.31 parts of dimethyl acetamide were added to the reactants. The temperature was raised to 125° C. and was held at 123° C. to 130° C. for 70 minutes with stirring. The epoxide equivalent weight was 1627, corresponding to 82 percent conversion of epoxide groups. The reactants were poured into a metal container and were placed in an oven at 125° C. The oven temperature was slowly raised to 150° C. over a period of 38 minutes and the temperature was held at 150° C. for 21 hours. The product had a melting point of 265° C. to 275° C., a viscosity of X to Y and a color of 1 to 2 at 20 percent nonvolatiles in the monobutyl ether of diethylene glycol, and no epoxide content.

*Example 5*

To a suitable reaction flask equipped as described in Example 1 were added 368.4 parts of the diglycidyl ether of Bisphenol A, epoxide equivalent weight 184.2, and 543.9 parts of tetrabromo Bisphenol A, the ratio of epoxide to phenolic equivalents being 1 to 1. Heat was applied raising the temperature to 120° C. where complete solution of the reactants was obtained. Dimethyl acetamide catalyst, 1.65 parts, was added. The temperature was held at 118° C. to 123° C. for 1.5 hours with stirring, at which time the epoxide equivalent weight of the reactants was 814, indicating about 50 percent reaction of the epoxide groups. The reactants were then heated at 140° C. in an oven for 22 hours. The product had a melting point range of 230° C. to 240° C. and a viscosity of G to H and color of 2 to 3 at 20 percent nonvolatiles in the monobutyl ether of diethylene glycol.

*Example 6*

To a suitable reaction vessel equipped with a thermometer and mechanical stirrer were added 1859 parts of the digylcidyl ether of Bisphenol A, epoxide equivalent weight 185.9, and 1107.3 parts of Bisphenol A, freezing point 153° C., the molar ratio of epoxide groups to phenolic groups being 1.03 to 1. Heat was applied to the reactants raising the temperature to 120° C. to dissolve the Bisphenol A in the epoxide compound. After solution was attained, 8.27 parts of dimethyl acetamide were added.

After 1 hour at 117° C. to 129° C. with stirring, the reactants were placed in an oven at 140° C. After 22 hours at 140° C., the resinous product melted at 255° C. to 265° C., and had a viscosity of Z to $Z_1$ and color of 2 at 20 percent nonvolatiles in the monobutyl ether of diethylene glycol.

Example 7

To a suitable reaction vessel equipped as previously described were added 373.6 parts of the diglycidyl ether of Bisphenol A, epoxide equivalent weight 186.8, and 226 parts of Bisphenol A, freezing point 153° C., the ratio of epoxide equivalents to phenolic equivalents being 1.0 to 0.99. Heat was applied raising the temperature of the reactants to 120° C. to dissolve the Bisphenol A in the epoxide compound. Tri-n-butylamine 0.926 part, was added to the reactants at 120° C. and the reactants were heated with stirring for 1 hour at 120° C. to 127° C. The reactants were then placed in an oven at 140° C. for 22 hours. The resulting product melted at 225° C. to 235° C., and had a viscosity of V to W and a color of 3 to 4 at 20 percent nonvolatiles in the monobutyl ether of diethylene glycol.

Example 8

To a suitable reaction flask equipped with a thermometer, mechanical stirrer and condenser were added 8.88 parts of butadiene dioxide (epoxide equivalent weight 44.4), 34.32 parts of the diglycidyl ether of Bisphenol A (epoxide equivalent weight 171.6) and 45.66 parts of Bisphenol A. Heat was applied to codissolve the reactants. At 100° C., 0.34 part of N,N-dimethyl acetamide was added. Heating with stirring was continued for 1 hour at 120° C. to 130° C. The flask contents were then heated without stirring in an oven at 125° C. for 22 hours. The resulting product had a melting point of 220° C. to 230° C., a viscosity of C and color of 2 to 3 at 20 percent nonvolatiles in the monobutyl ether of diethylene glycol.

Example 9

To a reaction flask equipped as described in Example 8 were added 294 parts of the diglycidyl ether of hydroquinone (epoxide equivalent weight—147) and 230.6 parts of Bisphenol A (freezing point 155° C.). Heat was applied to codissolve the reactants. At 120° C., after solution was attained, 1.71 parts of N,N-dimethyl acetamide were added to the flask. The flask contents were heated at 120° C. to 129° C. for 1.5 hours with stirring. At the end of this heating period, the reactants were placed in an oven and heated at 140° C. for 2 hours and 23 minutes. The resulting polymer had a melting range of 140° C. to 150° C. and a viscosity of J to K at 20 percent nonvolatiles in the monobutyl ether of diethylene glycol. After 2 hours additional heating, the resulting high molecular weight polymer had a melting point greater than 300° C., a viscosity of U and a color of 4 at 20 percent nonvolatiles in the monobutyl ether of diethylene glycol.

Example 10

To a reaction flask equipped as described in Example 8 were added 379.8 parts of the diglycidyl ether of Bisphenol A (epoxide equivalent weight—189.9) and 160.2 parts of 1,5-naphthalenediol. Heat was applied to codissolve the reactants. When solution was attained, and at 120° C., 3.97 parts of N,N-dimethyl benzamide were added. Heating with stirring was continued for 1 hour while holding the temperature between 120° C. and 130° C. The reactants were then placed in an oven at 125° C. for 2 hours and 35 minutes. The resulting polymer had a melting point of 250° C. to 260° C. and a viscosity of X to Y at 20 percent nonvolatiles in the monobutyl ether of diethylene glycol.

All of the resins produced in Examples 2 through 10 were coated on tin plates heated in a similar manner to that described in Example 1. All of the films or coatings so produced were found to have properties similar to films produced in Example 1.

Example 11

To a reaction flask equipped as described in Example 9 were added 186.8 parts of the digylcidyl ether of 1,4-butanediol (epoxide equivalent weight—147.5) and 143.8 parts of polycarbonate grade Bisphenol A. Heat was applied to codissolve the reactants. At 120° C., when solution was attained, 1.74 parts of N,N-dimethyl acetamide were added. Heating was continued for 4 hours and 17 minutes at 120° C. to 130° C. The reactants were then placed in a 125° C. oven and were heated for 64 hours and 25 minutes. A high molecular weight thermoplastic polymer having no epoxide groups resulted. Six parts of the thermoplastic polymer were dissolved in 8.8 parts of ethylene glycol monomethyl ether acetate, 7.1 parts of methyl ethyl ketone and 2.8 parts of toluene. To this solution were added, 3.5 parts of a butylated ureaformaldehyde resin at 60 percent solids in xylene and butanol. 2 mil films were prepared on electrolytic tin plate and were heated at 150° C. for 30 minutes. The well-cured films had excellent adhesion, mar resistance and flexibility.

Example 12

To a suitable reaction flask equipped with a mechanical stirrer, thermometer and condenser were added 1860 parts of diglycidyl ether of Bisphenol A (epoxide equivalent weight—186) and 1141.5 parts of Bisphenol A (freezing point 153° C.). Heat was applied to codissolve the reactants. When solution was attained, and at 119° C., 8.27 parts of dimethyl acetamide were added. Heating was continued for 53 minutes with stirring while holding the temperature between 119° C. and 137° C.

431.9 parts of the reaction product were transferred to another reaction flask equipped as described above. At 108° C., 431.2 parts of finely divided aluminum powder were added to the flask and were thoroughly dispersed in the reactants over a 7-minute period. The resin-aluminum mixture was then poured into a mold and was placed in an oven at 128° C. The oven temperature was raised to 140° C. over a 3-hour period and the reactants were heated at 140° C. for 16 hours and 47 minutes. An extremely hard aluminum-filled thermoplastic casting was obtained.

Example 13

To a reaction flask equipped as described in Example 12 were added 368.4 parts of the diglycidyl ether of Bisphenol A (epoxide equivalent weight—184.2) and 223.7 parts of Bisphenol A (freezing point—155° C.). Heat was applied to codissolve the reactants. When solution was attained and at 118° C., 1.65 parts of dimethyl acetamide were added. Heating was continued for 52 minutes at 118° C. to 128° C. 118.4 parts of micronized polyethylene were added to the reactants over a period of 43 minutes while holding the temperature at 116° C. to 122° C. The polyethylene was thoroughly dispersed in the resin with stirring over a 1-hour period while raising the temperature slowly to 170° C. The resin-polyethylene mixture was then placed in an oven for 18.5 hours at 140° C. A hard homogeneous casting of resin and filler was obtained.

Example 14

To a reaction flask equipped as described in Example 12 were added 368.4 parts of the diglycidyl ether of Bisphenol A (epoxide equivalent weight—184.2) and 223.7 parts of Bisphenol A (freezing point—155° C.). Heat was applied and at 111° C., 1.65 parts of dimethyl acetamide were added. The temperature was raised to 125° C. over a 9-minute period and 29.7 parts of finely divided polystyrene were added. The polystyrene was thoroughly dispersed in the resin with stirring over a 1-hour and 51-minute period while slowly raising the temperature to 225° C. 2.5 parts of diethyl dodecanamide were dissolved in the reactants, and the reactants were placed in an oven at 140° C. After 41 hours heating, the resulting product had a melting point of 215° C. to 225° C. and a viscosity of E at 20 percent nonvolatiles in dimethyl acetamide.

*Example 15*

To a suitable reaction vessel equipped with a stirrer, and thermometer were added 368.4 parts of the diglycidyl ether of p,p'-dihydroxydiphenyl propane (epoxide equivalent weight 184.2) and 224 parts of p,p'-dihydroxydiphenyl propane. Heat was applied and at 115° C., a homogeneous solution was obtained. At 120° C., 1.65 parts of N,N-dimethyl acetamide were added. The reactants were heated at 120° C. to 138° C. for 1 hour with stirring and were then heated for 1 hour in a 147° C. oven. After this heating period, the reactants had an epoxide equivalent weight of 6366 and a melting point of 145° C. to 155° C. The reaction product was ground to a fine powder in a morter and pestle and 459 parts of the powder were dispersed in 1000 parts of water containing 3.1 parts of dissolved sodium hydroxide. After heating for 25 hours at 80° C. to 90° C., a portion of the dispersed resinous reactants was removed and dried. It had an epoxide equivalent weight of 28,690 and a melting point of 180° C. to 190° C. Further heating of the dispersion for 56 hours produced a resin having an epoxide equivalent weight of 50,500 and a melting point of 210° C. to 220° C.

*Example 16*

Using the same procedure as was described in Example 1, 2,088 parts of the diglycidyl ether of Bisphenol A (epoxide equivalent weight—174) were reacted with 1356 parts of Bisphenol A using 8.53 parts of tri-n-butylamine as catalyst. The reactants were heated at 125° C. for 1 hour and 45 minutes. The low molecular weight product had a Durran's melting point of 100° C. The product was then heat aged for 22 hours at 125° C. The resulting high molecular weight thermoplastic resin had the following physical properties.

| | |
|---|---|
| Tensile _____p.s.i__ | 8,700 |
| Modulus _____ | $0.3 \times 10^6$ |
| Elongation _____ | 90 |
| Flexure _____p.s.i__ | 14,900 |
| Modulus _____ | $0.39 \times 10^6$ |
| Gardner impact (falling dart) [1] ____ft./lbs.__ | 37.5 |
| Heat distortion _____° C__ | 92 |
| Melting point _____° C__ | 280–290 |

[1] Society of Plastics Engineers, 21st Annual Technical Conference Technical Papers, volume XI, V2, p. 1ff.

*Example 17*

Using the same procedure as described in Examples 12–14, a filled casting was obtained by reacting 186.8 parts of the diglycidyl ether of Bisphenol A (epoxide equivalent weight—186.8), 111.8 parts of Bisphenol A (freezing point—155° C.) and 0.83 part of N,N-dimethyl acetamide with 298.6 parts of copper powder. The thermoplastic polymer melted at 240° C. to 260° C.

It is to be understood that the foregoing detailed description is given merely by way of illustration and that many variations may be made therein without departing from the spirit of the invention.

I claim:
1. A process for preparing high molecular weight polyhydroxypolyether thermoplastic resins which comprises
  (A) reacting in the presence of a basic organic catalyst selected from at least one member of the group consisting of tertiary amines, quaternary ammonium compounds, N-alkyl acid amides, N,N-dialkyl acid amides, dialkyl substituted ureas, tetraalkyl substituted ureas, dialkyl substituted thioureas, tetraalkyl substituted thioureas and alkyl substituted guanadines and in the absence of a solvent a diepoxide compound containing two terminal 1,2 epoxide groups and a diphenol containing two phenolic hydroxyl groups and no other groups reactive with epoxy groups under the conditions of the reaction wherein the diepoxide compound and the diphenol are in the ratio of one epoxy group of the diepoxide to about 0.95 to about 1.05 phenolic hydroxyl groups of the diphenol at a temperature of about 75° C. to about 140° C., said temperature being below the peak exothermic temperature generated in the reaction to form an intermediate thermoplastic resinous composition containing unreacted 1,2 epoxy groups and phenolic hydroxyl groups in substantially equivalent ratios and having a Durran's melting point of about 50° C. to about 180° C., and
  (B) heat aging the intermediate thermoplastic resinous composition at a temperature of about 90° C. to about 175° C., until the melting point of the thermoplastic resin is in excess of 200° C.
2. The process of claim 1 wherein the heat aging of the thermoplastic resinous composition is carried out with the thermoplastic resinous composition in the solid state.
3. The process of claim 1 wherein the resinous composition is in particulate form.
4. The process of claim 3 wherein the particles of the resinous composition are suspended in an inert non-solvent during heat aging.
5. The process of claim 1 wherein the diepoxide compound is the diglycidyl ether of p,p'-dihydroxyldiphenyl propane and the diphenol is p,p'-dihydroxydiphenyl propane.
6. The process of claim 1 wherein a filler which is non-reactive with phenolic groups, hydroxyl groups and epoxy groups is added to the intermediate thermoplastic resinous composition prior to the heat aging step.
7. The process of claim 1 wherein the step of reacting the diepoxide and the diphenol to form an intermediate thermoplastic resinous composition and the subsequent step of heat aging the resinous intermediate to form a high molecular weight thermoplastic resin is conducted as one operation.
8. A process for preparing high molecular weight polyhydroxypolyether thermoplastic resins which comprises
  (A) reacting in the presence of a basic organic catalyst selected from at least one member of the group consisting of tertiary amines and N,N-dialkyl acid amides and in the absence of a solvent a diglycidyl ether of a dihydric phenol and a diphenol wherein said phenols contain two phenolic hydroxyl groups and no other groups reactive with epoxy groups under the conditions of the reaction and wherein the diglycidyl ether and the diphenol are in the ratio of one epoxy group of the diglycidyl ether to about 0.95 to about 1.05 phenolic hydroxyl groups of the diphenol at a temperature of about 110° C. to about 130° C., said temperature being below the peak exothermic temperature generated in the reaction to form an intermediate thermoplastic resinous composition containing unreacted 1,2 epoxy groups and phenolic hydroxyl groups in substantially equivalent ratios and having a Durran's melting point of about 90° C. to about 140° C., and
  (B) heat aging the intermediate thermoplastic resinous composition at a temperature of about 110° C. to about 150° C., until the melting point of the thermoplastic resin is in excess of 250° C.
9. The process of claim 8 wherein the catalyst is tributylamine.
10. The process of claim 8 wherein the catalyst is dimethylacetamide.

References Cited

UNITED STATES PATENTS

| | | | |
|---|---|---|---|
| 2,945,004 | 7/1960 | Greenlee | 260—47 |
| 2,955,101 | 10/1960 | Bruin et al. | 260—47 |
| 3,177,089 | 4/1965 | Marshall et al. | 260—47 X |

WILLIAM H. SHORT, *Primary Examiner.*

T. D. KERWIN, *Assistant Examiner.*